United States Patent
Dwan

(10) Patent No.: US 10,268,431 B2
(45) Date of Patent: Apr. 23, 2019

(54) PRINTER AND METHOD THEREIN FOR PRINTING INFORMATION ON AT LEAST ONE ARTICLE

(71) Applicant: Dover Europe Sàrl, Vernier (CH)

(72) Inventor: James Dwan, Nottingham (GB)

(73) Assignee: Dover Europe Sàrl (CH)

( * ) Notice: Subject to any disclaimer, the term of this patent is extended or adjusted under 35 U.S.C. 154(b) by 0 days.

(21) Appl. No.: 15/536,035

(22) PCT Filed: Nov. 23, 2015

(86) PCT No.: PCT/EP2015/077336
§ 371 (c)(1),
(2) Date: Jun. 14, 2017

(87) PCT Pub. No.: WO2016/096324
PCT Pub. Date: Jun. 23, 2016

(65) Prior Publication Data
US 2018/0275937 A1     Sep. 27, 2018

Related U.S. Application Data

(60) Provisional application No. 62/092,292, filed on Dec. 16, 2014.

(51) Int. Cl.
*G06F 3/12* (2006.01)

(52) U.S. Cl.
CPC ............ *G06F 3/1282* (2013.01); *G06F 3/129* (2013.01); *G06F 3/1215* (2013.01); *G06F 3/1243* (2013.01); *G06F 3/1265* (2013.01)

(58) Field of Classification Search
CPC ...... G06F 3/1282; G06F 3/129; G06F 3/1243; G06F 3/1265
USPC .......................................... 358/1.15
See application file for complete search history.

(56) References Cited

U.S. PATENT DOCUMENTS

| | | | |
|---|---|---|---|
| 2012/0031545 A1* | 2/2012 | Vaccaro | G09F 1/00 156/153 |
| 2013/0163022 A1 | 6/2013 | Kuratomi | |
| 2018/0025185 A1* | 1/2018 | Hattrup | G06K 15/024 235/375 |

OTHER PUBLICATIONS

PCT/EP2015/077336 International Search Report dated Feb. 22, 2016, 3 pages.

* cited by examiner

*Primary Examiner* — Saeid Ebrahimi Dehkordy
(74) *Attorney, Agent, or Firm* — Lerner, David, Littenberg, Krumholz & Mentlik, LLP

(57) ABSTRACT

Embodiments herein relate to a printer for printing information on at least one article. The printer receives printing instructions to print information on the at least one article. The printing instructions indicate a remote data provider service from which at least a part of the information to be printed on the at least one article is to be requested. Then, the printer transmits a request to the remote data provider service requesting said at least part of the information from the remote data provider service when printing according to the received printing instructions. Also, the printer prints, on the at least one article, said requested at least part of the information upon receiving said requested at least part of the information from the remote data provider service.

11 Claims, 2 Drawing Sheets

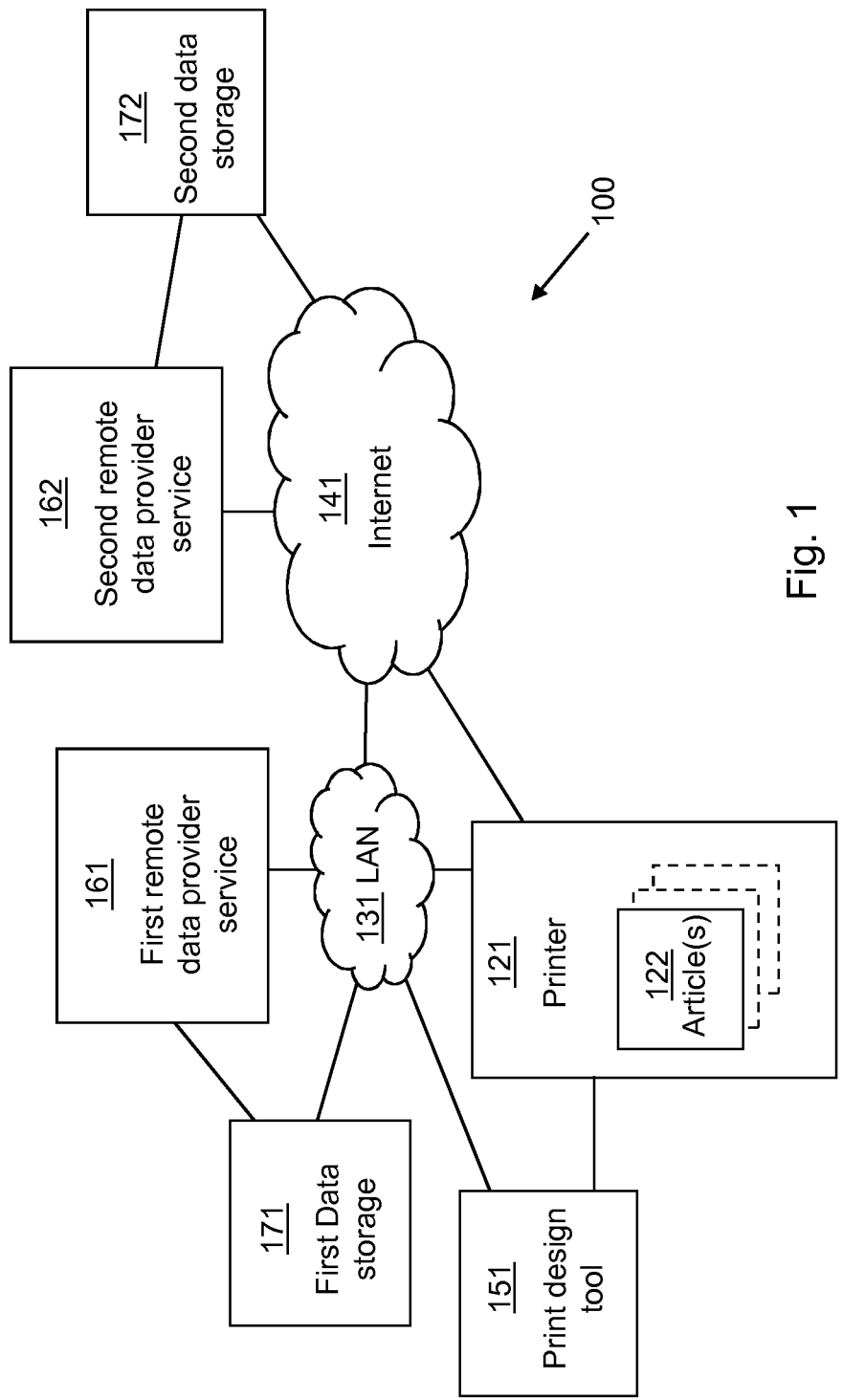

PRINTER AND METHOD THEREIN FOR PRINTING INFORMATION ON AT LEAST ONE ARTICLE

CROSS-REFERENCE TO RELATED APPLICATIONS

The present application is a national phase entry under 35 U.S.C. § 371 of International Application No. PCT/EP2015/077336 filed Nov. 23, 2015, published in English, which claims priority from U.S. 62/092,292 filed Dec. 16, 2014, all of which are incorporated herein by reference.

TECHNICAL FIELD

Embodiments herein relate to printers. In particular, embodiments herein relate to a printer and method therein for printing information on at least one article. Embodiments herein also relate to computer program products for printing information on at least one article.

BACKGROUND

In an industrial printing environment, numerous printers are typically configured to simultaneously print information on various types of items or articles. One example of an industrial printing environment may be the printing of labels on various types of packages or consumer goods. Consumer goods require a great deal of product identification, such as, for example, expiry dates, traceability data, etc. The information to be printed may vary from one item to another, from one batch of similar items or articles to another, from one site or time of manufacture to another, and from one type of print technology to another. This printing information may be provided to the printers in the form of printing instructions, which may comprise printer ready bitmap images or coding instructions wherein information to be printed is determined by the printer itself.

Today, the speed of the printing operations, especially for consumer goods, drives the need for real time industrial printing or coding possibilities. This need is currently met by printing systems being configured to "push" print data information to the printers whilst the production line is running. However, this may result in complications regarding the speed and synchronicity of the printing system, printers and the production line.

For example, often a host or printing application must poll the printer and apply heuristics to deduce whether the print data information was received and applied on time by the printer. This feedback information may be critical when, for example, printing a competition code. This is because it is important to be able to show that the winning competition code only has been applied once during the whole printing operation.

SUMMARY

It is an object of embodiments herein to improve printing of information on an article.

According to a first aspect of embodiments herein, the object is achieved by a method performed by a printer for printing information on at least one article. The printer receives printing instructions to print information on the at least one article, wherein the printing instructions indicate a remote data provider service from which at least a part of the information to be printed on the at least one article is to be requested. Then, the printer transmits a request to the remote data provider service requesting said at least part of the information from the remote data provider service when printing according to the received printing instructions. Thereafter, the printer prints, on the at least one article, said requested at least part of the information upon receiving said requested at least part of the information from the remote data provider service.

According to a second aspect of embodiments herein, the object is achieved by a printer for printing information on at least one article. The printer is configured to receive printing instructions to print information on the at least one article, wherein the printing instructions indicate a remote data provider service from which at least a part of the information to be printed on the at least one article is to be requested. Also, the printer is configured to then transmit a request to the remote data provider service requesting said at least part of the information from the remote data provider service when printing according to the received printing instructions. Furthermore, the printer is configured to thereafter print, on the at least one article, said requested at least part of the information upon receiving said requested at least part of the information from the remote data provider service.

According to a third aspect of embodiments herein, the object is achieved by a computer program for printing information on at least one article comprising instructions which, when executed on at least one processor of a printer, cause the printer to: receive printing instructions to print information on the at least one article, wherein the printing instructions indicate a remote data provider service from which at least a part of the information to be printed on the at least one article is to be requested, transmit a request to the remote data provider service requesting said at least part of the information from the remote data provider service when printing according to the received printing instructions, and print, on the at least one article, said requested at least part of the information upon receiving said requested at least part of the information from the remote data provider service.

By having the printer receiving printing instructions telling it that at least part of the information to be printed may be found at a remote data provider service, the printer is able to "pull" or request the information to be printed from the remote data provider service and print it on the at least one article. This enables a technology agnostic approach to be used for the printer which lends itself to interoperability between different systems. Thus, this will reduce or eliminate the work needed for system integration of systems using the printer and provides a better cross version stability.

Furthermore, contrary to the prior art solutions where any externally looked-up information is pushed to the printers, e.g. by a host system at the so-called job download time, this eliminates the need for controlling printer triggers and printing or production line speed when having information to be printed that is changing per print. In other words, the embodiments herein enable a host system to be decoupled from the real time requirements in the production line so that the host system does not have to be adapted to the production line.

Hence, the printing of information on an article is improved.

BRIEF DESCRIPTION OF THE DRAWINGS

Embodiments will now be described in more detail in relation to the enclosed drawings.

FIG. 1 is a schematic block diagram illustrating embodiments of a printer and a print design apparatus.

DETAILED DESCRIPTION

Figure 3:
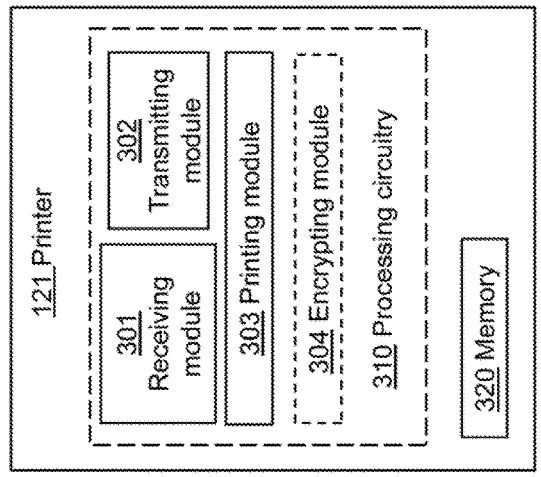
FIG. 3 is a schematic block diagram depicting embodiments of a printer.

The figures are schematic and simplified for clarity, and they merely show details for the understanding of the embodiments presented herein, while other details have been left out.

FIG. 1 shows an example of a communications network 100 in which embodiments herein may be implemented.

In FIG. 1, a printer 121 for printing information on at least one article 122 is connected to a Local Area Network, LAN, 131. Alternatively, the printer 121 may also be connected to Wide Area Network, WAN, or the Internet 141. It should also be noted that the printer 121 may be connected to both the LAN 131 and the Internet 141.

Furthermore, the printer 121 may be connected to a print design tool 151 configured to provide the printer 121 with print instructions. The print design tool 151 may also be a print design apparatus. The printer 121 may be connected to the print design tool or apparatus 151 directly or via the LAN 131.

The printer 121 may also be configured to communicate with a first remote data provider service 161 and a first data storage 171. This may be performed via the LAN 131 to which both the first remote data provider service 161 and the first data storage 171 is connected. Also, the printer 121 may be configured to communicate with a second remote data provider service 162 and a second data storage 172. This may be performed via the Internet 141 to which both the second remote data provider service 162 and the second data storage 172 is connected. In the following, the term remote data provider service together with the reference numbers 161 and 162 is used when referring to any of the first and second remote data provider services 161, 162. Also, the term data storage together with the reference numbers 171 and 172 is used when referring to any of the first and second data storages 171, 172.

The first remote data provider service 161 may be configured to obtain print information from at least one of the first and the second data storage 171, 172. The second remote data provider service 162 may be configured to obtain print information from the second data storage 172. It should further be noted that the first and second remote data provider service 161, 162 may be hosted on the cloud, i.e. on a third party server connected to the internet 141, or internal to a company's network, e.g. the LAN 131. The first and second remote data provider service 161, 162 may not require to look up data or print information from a secondary data source, i.e. at least one of the first and second data storage 171, 172. In fact, the first and second remote data provider service 161, 162 may themselves be a data storage, for example, when at least one of the first and second remote data provider service 161, 162 are databases and the printer 121 is talking to or communicating with them via Open Data Base Connectivity, ODBC. Alternatively, at least one of the first and second remote data provider service 161, 162 may not require to look up data or print information from a secondary data source, for example, when at least one of the first and second remote data provider service 161, 162 is a web service using an algorithm, e.g. competition code generation algorithm, to generate data or print information. At least one of the first and second remote data provider service 161, 162 may be a web service, computer program, or database hosted on the LAN 131 or the internet 141.

Furthermore, although embodiments below are described with reference to the scenario of FIG. 1, this scenario should not be construed as limiting to the embodiments herein, but merely as an example made for illustrative purposes.

Figure 2:
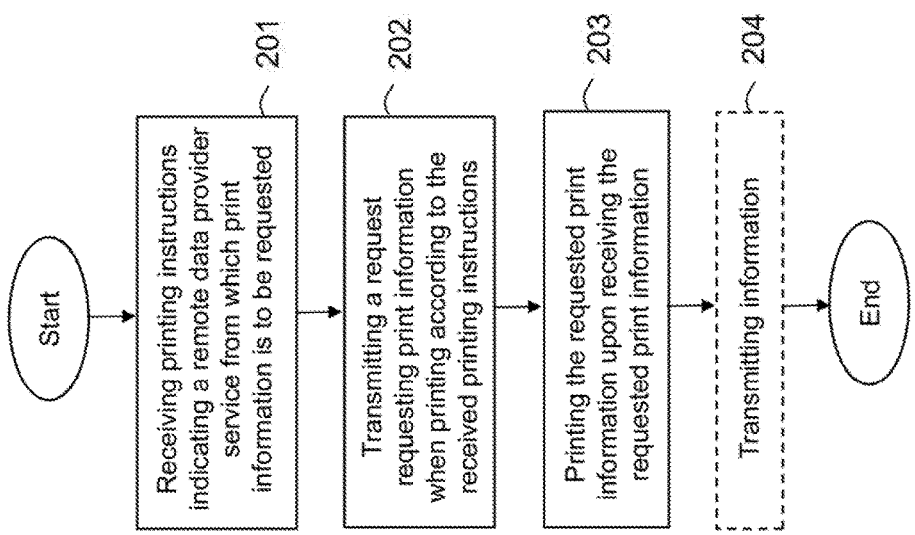
FIG. 2 is a flowchart depicting embodiments of a method in a printer.

Example of embodiments of a method performed by a printer 121 for printing information on at least one article 122 will now be described with reference to the flowchart depicted in FIG. 2. FIG. 2 illustrates an example of actions or operations which may be taken by the printer 121.

Action 201

In this action, the printer 121 receives printing instructions to print information on the at least one article 122. The printing instructions indicate a remote data provider service, for example, one or more of the first and second remote data provider service 161, 162, from which at least a part of the information to be printed on the at least one article 122 is to be requested. This may, for example, occur as a consequence of a user of the printer 121 selecting a print job to be performed by the printer 121. This may in turn be performed by the user, for example, directly on the printer 121 or via a separate print design tool or apparatus 151, or by an automated system.

In some embodiments, the printing instructions may further comprise data indicating the information to be printed on the at least one article 122. Here, the data may comprise one or more information data fields of which at least one information data field is associated with a parameter. This parameter may indicate to the printer 121 that the information to be printed according to the at least one information data field is to be requested from the remote data provider service 161, 162. The parameter may be, for example, an explicit indicator or instruction comprised in or associated with the information data field, or an implicit indicator associated with the information data field, such as, an attribute or a property of the information data field. In other words, the parameter may be a specially configured data source parameter of the information data field comprised in the printing instructions which notifies the printer 121 how to look up data from an external data source, i.e. the remote data provider service 161, 162.

In some embodiments, the parameter may, for example, indicate a web address or Uniform Resource Locator, URL, which indicates where to access the remote data provider service 161, 162 in the communications network 100.

It should here be noted that according to some embodiments, the remote data provider service 161, 162 may be a web service application configured to pull the requested information from at least one data storage 171, 172 based on the received request.

Action 202

Following the reception in Action 201, the printer 121 transmits a request to the remote data provider service 161, 162 requesting said at least part of the information from the remote data provider service 161, 162 when printing according to the received printing instructions. This means that the printer 121 pulls the at least part of the information from the remote data provider service 161, 162 upon commencing its printing operation based on the received printing instructions.

In some embodiments, when at least one information data field is associated with a parameter and the parameter indicates that the same information is required for the at least one data field each time the printer 121 prints according to the received printing instructions, the printer 121 may transmit a request for the required information when the printer 121 prints according to the received printing instructions. This may be performed, for example, when at least a part of the information to be printed comprise print data, e.g. a value, a bitmap or other information, which remains static for an entire print job or production run. A print job or productions run may be a printing operation that is valid for a determined number of articles 122 on a production line. This may also be referred to as a static data pull operation per print job. One example of this could be to look up the latest product name for the determined number of articles 122 from a production database or a web server.

In some embodiments, when at least one information data field is associated with a parameter and the parameter indicates that different information is required for the at least one data field each time the printer 121 prints according to the received printing instructions, the printer 121 may transmit a request for the required information each time the printer 121 prints according to the received printing instructions. This may be performed, for example, when at least a part of the information to be printed comprise print data, e.g. a value, a bitmap or other information, which changes per print for an entire print job or production run. This may also be referred to as multiple data pull operations, data list pull operations, data queue pull operations, etc., per print job (or, simply, a per print operation) or production run.

In some embodiments, when at least one information data field is associated with a parameter and the parameter indicates that different information is required for the at least one data field each time the printer 121 prints according to the received printing instructions, the printer 121 may transmit a request for all required different information for all times the printer 121 is to print according to the received printing instructions. This may be performed, for example, when at least a part of the information to be printed comprise print data, e.g. a value, a bitmap or other information, which changes per print for an entire print job or production run and there is a need for particular high speed in the printing operation. This means that the printer 121 may be configured to request a batch of values or parameters, e.g. an N number of values or parameters, from the remote data provider service 161, 162. N is a positive integer. This may also be referred to as a single batch pull operation or batch print per print job or production run. This may also be referred as sort of a caching a number of values, bitmaps or other information, i.e. print data, for faster printing.

According to some embodiments, the printer 121 may use "low tide marks" to decide when to request more print data. The "low tide marks", or low watermark, is used to be able to timely make a request for more print data before the print is completed; this in order to allow for continuous printing. The printer 121 may either complete all the data prints from the previous request, or switch over to the new data set to be printed abandoning the not yet completed prints from the previous request.

Furthermore, in some embodiments, the printer 121 may encrypt the request to the remote data provider service 161, 162. Here, the printer 121 may also decrypt the requested at least part of the information received from the remote data provider service 161, 162 in case the requested at least part of the information is encrypted in return.

Action 203

The printer 121 prints on the at least one article 122 the requested at least part of the information upon receiving the requested at least part of the information from the remote data provider service 161, 162. This means that the requested at least part of the information to be printed is physically printed by the printer 121 on the at least one article 122 when the requested at least part of the information to be printed is received from the remote data provider service 161, 162.

Action 204

In this optional action (the optional action is indicated with a dotted box), the printer 121 may transmit information to the remote data provider service 161, 162 indicating the printing status of said requested at least part of the information when printing according to the received printing instructions. This means that the printer 121 may report back to the remote data provider service 161, 162, as data is being printed. This means that the remote data provider service 161, 162 may keep track of which request have been printed or not, and provides a fault handling mechanism in the printer 121.

This may, for example, be important in a competition code scenario where it is important to establish that the winning competition code is actually printed and only printed once. Furthermore, this information may be used by the printer 121 to report back what was printed and what was not printed when performing a single batch pull operation or batch print as described above. The information may, for example, indicate that a complete print or a partial print of requested information from the remote data provider service 161, 162 was actually printed, or that the requested information from the remote data provider service 161, 162 was re-printed, or that the printing of the requested information from the remote data provider service 161, 162 failed.

To perform the method actions in the printer 121 for printing information on at least one article 122, the printer 121 may comprise the following arrangement depicted in FIG. 3. FIG. 3 shows a schematic block diagram of embodiments of the printer 121.

In some embodiments, the printer 121 may comprise a receiving module 301, a transmitting module 302, a printing module 303, and an encrypting module 304. In some embodiments, the printer 121 may comprise a processing circuitry 310, which may also be referred to as processing module, processing unit or processor. The modules with dotted boxes indicate that the modules are optional. The processing circuitry 310 may comprise one or more of the receiving module 301, the transmitting module 302, the printing module 303, and the encrypting module 304, and/or itself perform the function thereof. The receiving module 301 may be referred to as a transceiving module. The transmitting module 302 may be referred to as a transceiving module.

The printer 121 is configured to, e.g. by means of the receiving module 301, receive printing instructions to print information on the at least one article 122. The printing instructions indicate a remote data provider service 161, 162 from which at least a part of the information to be printed on the at least one article 122 is to be requested. Also, the printer 121 is configured to, e.g. by means of the transmitting module 302, transmit a request to the remote data provider service 161, 162 requesting said at least part of the information from the remote data provider service 161, 162 when printing according to the received printing instructions. Furthermore, the printer 121 is configured to, e.g. by means of the printing module 303, print, on the at least one article 122, the requested at least part of the information upon receiving the requested at least part of the information from the remote data provider service 161, 162.

In some embodiments, the printing instructions may comprise data indicating the information to be printed on the at least one article 122. Here, the data may comprise one or more information data fields of which at least one information data field is associated with a parameter indicating that the information to be printed according to the at least one information data field is to be requested from the remote data provider service 161, 162.

Also, in some embodiments, when the parameter indicates that the same information is required for the at least one data field each time the printer 121 prints according to the received printing instructions, the printer 121 is configured to, e.g. by means of the receiving module 301, transmit a request for the required information when the printer 121 prints according to the received printing instructions. Alternatively, according to some embodiments, when the parameter indicates that different information is required for the at least one data field each time the printer 121 prints according to the received printing instructions, the printer 121 is configured to, e.g. by means of the transmitting module 302, transmit a request for the required information each time the printer 121 prints according to the received printing instructions. According to another alternative, in some embodiments, when the parameter indicates that different information is required for the at least one data field each time the printer 121 prints according to the received printing instructions, the printer 121 is configured to transmit a request for all required different information for all times the printer 121 is to print according to the received printing instructions.

Furthermore, in some embodiments, the printer 121 may be further configured to, e.g. by means of the transmitting module 302, transmit information to the remote data provider service 161, 162 indicating the printing status of said requested at least part of the information when printing according to the received printing instructions. In some embodiments, the printer 121 may be further configured to, e.g. by means of the encrypting module 304, encrypt the request to the remote data provider service 161,162 and to decrypt the received requested at least part of the information from the remote data provider service 161, 162.

According to some embodiments, the remote data provider service 161, 162 may be a web service application configured to obtain the requested information from the at least one data storage device 171, 172 based on the received request.

The embodiments for printing information on at least one article 122 may be implemented through one or more processors, such as, e.g. the processing circuitry 310 in the printer 121 depicted in FIG. 3, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 310 in the printer 121. The computer program code may e.g. be provided as pure program code in the printer 121 or on a server and downloaded to the printer 121. The carrier may be one of an electronic signal, optical signal, radio signal, or computer readable storage medium, such as, e.g. electronic memories like a Random Access Memory (RAM), a Read Only Memory (ROM), a Flash memory, a magnetic tape, a Compact Disc-Read Only Memory (CD-ROM), a Digital Versatile Disc (DVD), a Blu-ray disc, etc.

The printer 121 may further comprise a memory 320, which may be referred to or comprise one or more memory modules or units. The memory 320 may be arranged to be used to store executable instructions and data to perform the methods described herein when being executed in the printer 121. Those skilled in the art will also appreciate that the processing circuitry 310 and the memory 320 described above may refer to a combination of at least one of an analog and digital circuits, one or more processors configured with software and firmware, e.g. stored in the memory 320, that when executed by the one or more processors such as the processing circuitry 310 perform the method as described above. The processing circuitry 310 and the memory 320 may also be referred to as processing means. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

From the above it may be seen that some embodiments may comprise a computer program product, comprising instructions which, when executed on at least one processor, e.g. the processing circuitry 310 or modules 301-304, cause the at least one processor to carry out the method for printing information on at least one article 122. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described printer, method therein or computer program product, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a printer for printing information on at least one article, the method comprising:
receiving printing instructions to print information on the at least one article, wherein the printing instructions indicate a remote data provider service from which at least a part of the information to be printed on the at least one article is to be requested;
transmitting a request to the remote data provider service requesting said at least part of the information from the remote data provider service when printing according to the received printing instructions; and
printing, on the at least one article, said requested at least part of the information upon receiving said requested at least part of the information from the remote data provider service,
wherein the printing instructions further comprise data indicating the information to be printed on the at least one article, wherein the data comprise one or more information data fields of which at least one information data field is associated with a parameter which indicates that the information to be printed according to the at least one information data field is to be requested from the remote data provider service, and
when the parameter further indicates that different information is required for the at least one data field each time the printer prints according to the received printing instructions, the transmitting further comprises transmitting a request for all required different information for all times the printer is to print according to the received printing instructions, wherein the method further comprises:
transmitting information to the remote data provider service indicating the printing status of said requested at least part of the information when printing according to the received printing instructions,
wherein the transmitted information indicates that a complete print or a partial print of requested information was printed, or that the requested information was re-printed, or that the printing of the requested information failed.

2. The method according to claim 1, wherein, when the parameter further indicates that the same information is required for the at least one data field each time the printer prints according to the received printing instructions, the transmitting further comprises transmitting a request for the required information when the printer prints according to the received printing instructions.

3. The method according to claim 1, wherein, when the parameter further indicates that different information is required for the at least one data field each time the printer prints according to the received printing instructions, the transmitting further comprises transmitting a request for the required information each time the printer prints according to the received printing instructions.

4. The method according to claim 1, further comprising encrypting the request to the remote data provider service and decrypting the received requested at least part of the information from the remote data provider service.

5. The method according to claim 1, wherein the remote data provider service is a web service application configured to pull the requested information from at least one data storage based on the received request.

6. A printer for printing information on at least one article, wherein the printer is configured to receive printing instructions to print information on the at least one article, wherein the printing instructions indicate a remote data provider service from which at least a part of the information to be printed on the at least one article is to be requested, transmit a request to the remote data provider service requesting said at least part of the information from the remote data provider service when printing according to the received printing instructions, and print, on the at least one article, said requested at least part of the information upon receiving said requested at least part of the information from the remote data provider service,
wherein the printing instructions comprise data indicating the information to be printed on the at least one article, wherein the data comprise one or more information data fields of which at least one information data field is associated with a parameter which indicates that the information to be printed according to the at least one information data field is to be requested from the remote data provider service, and
when the parameter further indicates that different information is required for the at least one data field each time the printer prints according to the received printing instructions, the printer is configured to transmit a request for all required different information for all times the printer is to print according to the received printing instructions, wherein the printer is further configured to transmit information to the remote data provider service indicating the printing status of said requested at least part of the information when printing according to the received printing instructions,
wherein the transmitted information indicates that a complete print or a partial print of requested information was printed, or that the requested information was re-printed, or that the printing of the requested information failed.

7. The printer according to claim 6, wherein, when the parameter further indicates that the same information is required for the at least one data field each time the printer prints according to the received printing instructions, the printer is configured to transmit a request for the required information when the printer prints according to the received printing instructions.

8. The printer according to claim 6, wherein, when the parameter further indicates that different information is required for the at least one data field each time the printer prints according to the received printing instructions, the printer is configured to transmit a request for the required information each time the printer prints according to the received printing instructions.

9. The printer according to claim 6, further configured to encrypt the request to the remote data provider service and to decrypt the received requested at least part of the information from the remote data provider service.

10. The printer according to claim 6, wherein the remote data provider service is a web service application configured to obtain the requested information from the at least one data storage based on the received request.

11. A non-transitory computer-readable storage medium containing a program product for printing information on at least one article comprising instructions which, when executed on at least one processor of a printer, cause the printer to:
receive printing instructions to print information on the at least one article, wherein the printing instructions indicate a remote data provider service from which at least a part of the information to be printed on the at least one article is to be requested, transmit a request to the remote data provider service requesting said at least part of the information from the remote data provider service when printing according to the received printing instructions, and print, on the at least one article, said requested at least part of the information upon receiving said requested at least part of the information from the remote data provider service, wherein the printing instructions comprise data indicating the information to be printed on the at least one article, wherein the data comprise one or more information data fields of which at least one information data field is associated with a parameter which indicates that the information to be printed according to the at least one information data field is to be requested from the remote data provider service, and when the parameter further indicates that different information is required for the at least one data field each time the printer prints according to the received printing instructions, the printer is configured to transmit a request for all required different information for all times the printer is to print according to the received printing instructions, wherein the computer program product further comprises instructions which, when executed on at least one processor of a printer, cause the printer to transmit information to the remote data provider service indicating the printing status of said requested at least part of the information when printing according to the received printing instructions, wherein the transmitted information indicates that a complete print or a partial print of requested information was printed, or that the requested information was re-printed, or that the printing of the requested information failed.

* * * * *